United States Patent
Berkman et al.

(10) Patent No.: US 7,363,630 B2
(45) Date of Patent: Apr. 22, 2008

(54) SYSTEM AND METHOD OF INTELLIGENT QUEUING

(75) Inventors: Peter C. Berkman, San Dimas, CA (US); Gevik H. Nalbandian, Northridge, CA (US); Jerry A. Waldorf, West Hills, CA (US); Nathan K. Inada, Pasadena, CA (US); Rangaswamy Srihari, Arcadia, CA (US); Alexander Demetriades, Pasadena, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 215 days.

(21) Appl. No.: 11/189,225

(22) Filed: Jul. 25, 2005

(65) Prior Publication Data

US 2006/0053425 A1 Mar. 9, 2006

Related U.S. Application Data

(63) Continuation of application No. 09/704,016, filed on Nov. 1, 2000, now Pat. No. 6,970,945.

(60) Provisional application No. 60/162,927, filed on Nov. 1, 1999.

(51) Int. Cl.
*G06F 13/38* (2006.01)
*G06F 13/14* (2006.01)
*G06F 3/01* (2006.01)
*G06F 9/44* (2006.01)

(52) U.S. Cl. ..................... 719/314; 719/313
(58) Field of Classification Search .............. 719/314, 719/313
See application file for complete search history.

(56) References Cited

U.S. PATENT DOCUMENTS

| 4,949,251 | A | * | 8/1990 | Griffin et al. .............. 714/20 |
| 5,278,984 | A | | 1/1994 | Batchelor |
| 5,371,850 | A | | 12/1994 | Belsan et al. |
| 5,406,557 | A | | 4/1995 | Baudoin |
| 5,530,848 | A | | 6/1996 | Gilbert et al. |

(Continued)

FOREIGN PATENT DOCUMENTS

EP 0 806 731 11/1997

(Continued)

OTHER PUBLICATIONS

Horrell, Simon, "Microsoft Message Queue (MSMQ)", Enterprise Middleware, Jun. 1999, pp. 25-35.

(Continued)

*Primary Examiner*—William Thomson
*Assistant Examiner*—Richard Pantoliano, Jr.
(74) *Attorney, Agent, or Firm*—Hickman Palermo Truong & Becker LLP

(57) ABSTRACT

An intelligent queue may be used to facilitate communication among a set business application programs. In one embodiment, the intelligent queue may interact with a variety of business application programs providing consistent service behaviors across a variety of data store products. The intelligent queue provides extended message storage, efficient journalling, interoperability with other intelligent queues, load balancing, once-only processing, as well as detailed message state information that tracks the status of each message from both the sender and the recipient's perspective.

14 Claims, 9 Drawing Sheets

U.S. PATENT DOCUMENTS

| | | | |
|---|---|---|---|
| 5,835,762 | A | 11/1998 | Gans et al. |
| 5,856,978 | A | 1/1999 | Anthias et al. |
| 5,870,548 | A | 2/1999 | Nielsen |
| 5,881,315 | A * | 3/1999 | Cohen ................... 710/52 |
| 5,893,076 | A | 4/1999 | Hafner et al. |
| 5,928,333 | A | 7/1999 | Landfield et al. |
| 5,960,178 | A | 9/1999 | Cochinwala et al. |
| 5,983,265 | A | 11/1999 | Martino, II |
| 6,023,722 | A | 2/2000 | Colyer |
| 6,039,245 | A | 3/2000 | Symonds et al. |
| 6,058,389 | A * | 5/2000 | Chandra et al. ............. 707/1 |
| 6,067,354 | A * | 5/2000 | Bauer et al. .......... 379/201.01 |
| 6,275,957 | B1 * | 8/2001 | Novik et al. .................. 714/39 |
| 6,302,326 | B1 | 10/2001 | Symonds et al. |

FOREIGN PATENT DOCUMENTS

| | | |
|---|---|---|
| WO | WO 95/10805 | 4/1995 |
| WO | WO 98/59519 | 12/1998 |

OTHER PUBLICATIONS

"MQSeries Version 5: The Next Generation," Published by IBM Corporation, date unknown.

"Windows NT Server: Optimizing Performance in a Microsoft Message Queue Server Environment," A White Paper Published by Microsoft Corp., 1998.

"Building Distributed Applications in Message Queuing Middleware," by Peter Houston, Published by Microsoft Corp., Mar. 1998.

"Matching IT Capability to managerial vision through Enterprise Integration," Published by IBM Corp., Dec. 21, 1999.

"Application Integration," Published in MessageQ.com, Oct. 22, 1999.

"The MQSeries Systems Management Market," by Les Yeamans, Published by IBM Corp., Nov. 29, 1997 "Message Delivery," Published in MessageQ.com, Nov. 1, 1999.

"MSMQ System Management," by North American Systems Group, Inc., Published in MessageQ.com, Mar. 1999.

"MQSeries: Message Oriented Middleware," Published by IBM Corp., Oct. 21, 1999.

"Message Delivery," Published in MessageQ.com, Nov. 1, 1999.

"Push Technology: Oracle plans its database push support," by Paul Krill, Published in InfoWorld.com, Apr. 21, 1997.

* cited by examiner

| Message ID | PUBLISHER X | | SUBSCRIBER 0 | | SUBSCRIBER 1 | | SUBSCRIBER 2 | |
|---|---|---|---|---|---|---|---|---|
| | Put: | 12:14:03 | Get: | 12:14:13 | Get: | 12:14:25 | Get: | 12:15:08 |
| | Revealed: | 12:14:12 | Fetched: | 12:14:26 | Fetched: | 12:15:26 | Fetched: | 12:15:32 |
| | Unavailable: | ------ | Unusable: | ------ | Unusable: | ------ | Unusable: | 12:15:44 |
| | Journalled: | 12:16:09 | Inprocess: | ------ | Inprocess: | 12:15:51 | Inprocess: | ------ |
| | Current: | Journalled | Done: | 12:14:54 | Done: | 12:16:01 | Done: | ------ |
| | | | Expired: | ------ | Expired: | ------ | Expired: | ------ |
| | | | Journalled: | 12:15:02 | Journalled: | 12:16:07 | Journalled: | 12:15:59 |
| | | | Current: | Journalled | Current: | Journalled | Current: | Journalled |

SYSTEM AND METHOD OF INTELLIGENT QUEUING

CROSS-REFERENCE TO RELATED APPLICATIONS

This application is a continuation application and claims the benefit of priority under 35 U.S.C. Section 120 of U.S. application Ser. No. 09/704,016, filed on Nov. 1, 2000, now U.S. Pat. No. 6,970,945, which claims priority to U.S. Provisional Application Ser. No. 60/162,927, filed Nov. 1, 1999. The disclosure of the prior applications is considered part of and is incorporated by reference in the disclosure of this application.

TECHNICAL FIELD

The present invention is generally related to the field of network messaging, and in particular to queues.

BACKGROUND

The increased growth of the software industry has made a large variety of applications available to the public, and the public has learned to rely heavily upon these applications. Furthermore, it is common for businesses to employ multiple applications within their companies for day-to-day activities. Because these applications are provided by various vendors, coordination to support routine business operations becomes a daunting task often requiring manual labor provided by resources that could be used elsewhere. Thus, it is important for businesses to enable their applications to communicate and share information in an efficient and secure manner.

While businesses need the ability to integrate their applications to coordinate and share information, business also want to minimize the costs in performing such integration. One common problem with conventional approaches is that business are forced to purchase custom message queues that are expensive and difficult to integrate into their existing systems. As the business changes, these custom queues must be replaced or updated costing even more time and expense.

An additional problem with conventional approaches is that system managers are faced with the burdensome task of attempting to manage a variety of data store components. Messages are difficult to track both during normal communication processes as well as during times of system failure.

An additional problem with conventional approaches is that they permit duplicate processing of messages. In some applications, it is imperative that a message is processed only once. For example, a financial application should only debit a user's account once for each transaction. Duplicate processing of messages results in inaccurate information and requires vast amounts of resources to restore data to its proper state.

A further problem with conventional approaches is that the queues are often overworked causing bottlenecks within the system.

SUMMARY

One embodiment of the present invention is a message queue management system configured to manage a first message queue of a first data store type and a second message queue of a second data store type, wherein the first message queue and the second message queue exhibit consistent behavior across a plurality of computer mediums. The message queue management system comprises a journalling module configured to track and manage message states of messages stored in the first message queue and the second message queue including a journalled state whereby journalled messages are retained in the first message queue and the second message queue. The message queue management system also comprises a once-only message processing module configured to track a plurality of message states to prevent re-processing of previously processed messages stored in the first message queue and the second message queue. In addition, the message queue management system further comprises an extended storage module configured to retain the message in the first message queue and the second message queue when the journalling module specifies a journalled state and an interoperating module configured to coordinate interactions between the first message queue and the second message queue to perform data recovery on the first message queue and the second message queue upon the event of a failure. The message queue management module also comprises a once-only message processing module configured to track a plurality of message states to prevent re-processing of previously processed messages stored in the first message queue and the second message queue. In addition, the message queue management module comprises an interoperability module configured to coordinate interactions among the plurality of queues enabling a distributed workflow and a recovery module configured to perform data recovery on the plurality of queues upon the event of a failure. The message queue management module also comprises a central managing module configured to provide single point control of the plurality of queues, wherein the single point control includes controlling a plurality of publishers and a plurality of subscribers and a load balancing module configured to designate a subset of the plurality of subscribers to at least the first message queue in a subscriber pool such that messages in the first message queue are processed by a first available subscriber in the subscriber pool.

Another embodiment of the present invention is an intelligent queue used to facilitate communication among a set business application programs. The intelligent queue may interact with a variety of business application programs using a variety of data store products. The intelligent queue provides extended message storage, once-only processing, and/or detailed message state information that tracks the status of messages from both the sender and the recipient's perspective.

In one embodiment, the present invention is a message queuing system for computer networks that provides reliable communication, ensures non-repetitive delivery, and is implemented in a medium-independent environment. The message queuing system comprises a message queue configured to run on one of a plurality of environments and to store messages received from message publishers. In addition, the message monitors retrieval by a plurality of message subscribers wherein a message is retained in the message queue after at least one of the plurality of message subscribers has accessed the message to permit additional access to the message. A message state module is configured to track message states of a message, wherein message state information indicates whether the message has been made available to and retrieved by at least one of the plurality of the message subscribers. A recording module is configured to selectively retain the message state information related to corresponding messages at least until the message is removed from the message queue. An interface module is configured to receive and send a plurality of types of data objects in messages and to communicate with a plurality of types of data messaging systems that act as message publishers or message subscribers.

Another embodiment of the present invention is a method of message queuing among a plurality of message publishers and a plurality of message subscribers. The method comprises receiving a data object from a message publisher intended for at least one message subscriber; processing the data object to create a corresponding message wherein the corresponding message includes the data object and message information, storing the message in a message queue; tracking the status of the message from the perspective of the message publisher, tracking the status of the message from the perspective of the at least one message subscriber, and selectively retaining the message to remain in the message queue after the message has been retrieved by the at least one message subscriber.

An additional embodiment of the present invention is a method for journalling a plurality of messages in a message queue, wherein the plurality of messages include a plurality of corresponding message states. The method comprises receiving a message, wherein the message includes a publisher message state and a subscriber message state. The method also comprises placing the message in a message queue and changing the publisher message state of the message to a journalled state. In addition, the method comprises retaining the message in the message queue.

Another embodiment of the present invention is a method of subscriber pooling a plurality of messages in a message queue, wherein the plurality of message includes corresponding publisher states. The method comprises placing a message in a message queue, informing a plurality of subscribers that the message is available, and upon retrieval by one of the plurality of subscribers, preventing other of the plurality of subscribers from retrieving the message by changing the publisher message state to a terminal state.

An additional embodiment of the present invention is a system for message queuing among a plurality of message publishers and a plurality of message subscribers. The system comprises a message queue module configured to communicate with a plurality of message publishers and a plurality of message subscribers and to receive a data object from a message publisher intended for at least one of a plurality of message subscribers. A data object processing module is configured to process the data object to create a corresponding message, wherein the corresponding message includes the data object and message information. A publisher tracking module is configured to track the status of the message from the perspective of the message publisher. A plurality of subscriber tracking modules are configured to track the status of the message from the perspective of the at least one of a plurality of intended message subscribers. A message tracking module is configured to selectively retain the message to remain in the message queue after the message has been retrieved by the at least one of a plurality of intended message subscribers.

Another embodiment of the present invention is a method for queuing messages received from a publisher for retrieval by a subscriber comprising storing messages using a queue and a queue interface module, wherein the queue interface module is configurable to interface with a plurality of database protocols, extending message storage beyond the time in which the message has been retrieved by all intended subscribers, and tracking message states to enforce once-only delivery.

Another embodiment of the present invention is a method for restoring message communication between a first message queue implemented using a first type of data store and a second message queue implemented using a second type of data store. The method comprises processing the first message queue to locate messages that have not been revealed. For messages that have not been revealed, path information is extracted to find message parents of the message. The message parents' states in the second message queue are inspected. Message parents are marked as "done," and the message is "revealed" if at least one of the parent messages is marked "done." In addition, the method comprises marking all message parents "clean" and the message "deleted" when the parent messages are not marked "done," marking the message "revealed" if there are no parents. Also, messages marked "clean" are recovered and the second message queue is processed to find messages that are marked "fetched" but not "done." Furthermore, messages in the second message queue that are marked "fetched" but not "done" are marked as "clean."

Another embodiment of the present invention is a system for queuing messages received from a publisher for retrieval by a subscriber comprising means for storing messages using a queue and a queue interface module wherein the queue interface module is configurable to interface with a plurality of database protocols, means for extending message storage beyond the time in which the message has been retrieved by all intended subscribers, and means for tracking message states to enforce once-only delivery.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

DESCRIPTION OF DRAWINGS

FIG. 5 illustrates one embodiment of a message information record.

DETAILED DESCRIPTION

Figure 1A:
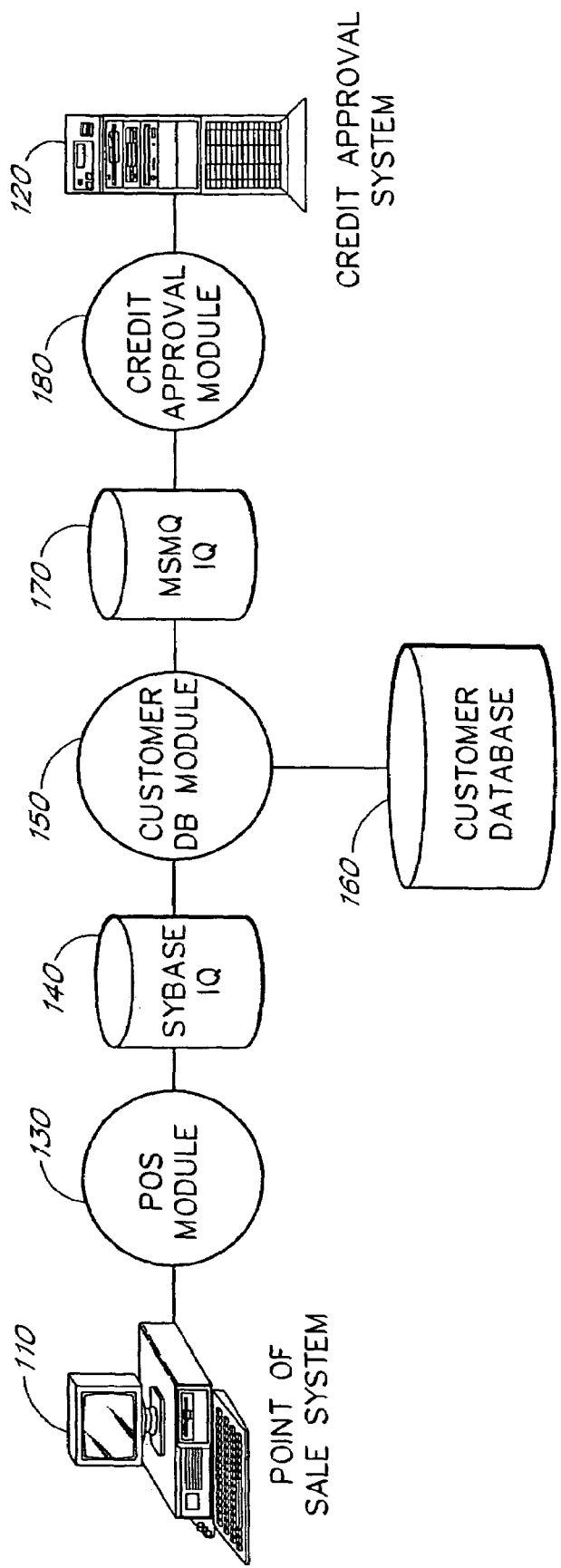
FIG. 1A illustrates a high-level block diagram of one embodiment of an application integration system that includes intelligent queues.

A system and method which represent one embodiment and example application of the invention will now be described with reference to the drawings. Variations to the system and method which represent other embodiments will also be described. In one disclosed embodiment, the system and method are used to allow communication among a set of business application programs.

For purposes of illustration, one embodiment will be described in the context of business application programs. The inventors contemplate that the present invention is not limited by the type of programs discussed, and that the types of objects may include any program, such as, for example, a software module, a business application program, a database, an accounting program, a music program, a telephone system, and so forth. The figures and descriptions, however, relate to an embodiment of the invention wherein the program is a business application program. Furthermore, it is recognized that in other embodiments, the system and method for message queuing may be implemented as a single module and/or implemented in conjunction with a variety of other modules and the like. Moreover, the specific implementations described herein are set forth in order to illustrate, and not to limit, the invention. The scope of the invention is defined by the appended claims.

These and other features will now be described with reference to the drawings summarized above. The drawings and the associated descriptions are provided to illustrate embodiments of the invention, and not to limit the scope of the invention. Throughout the drawings, reference numbers may be re-used to indicate correspondence between referenced elements. In addition, the first digit of each reference number indicates the figure in which the element first appears.

In an application integration system, a novel intelligent queue may be used to facilitate communication among a set business application programs. In one embodiment, the intelligent queue may interact with a variety of business application programs using a variety of data store products. The intelligent queue provides extended message storage, once-only processing, and/or detailed message state information that tracks the status of each message from both the sender and the recipient's perspective.

A benefit of one embodiment is that the intelligent queues are medium-independent in that they may use a variety of data store components, such as, for example, a B+tree, the Sybase CT Lib database, the Oracle OCI database, the Oracle AQ database, an IBM-MQ Series database, the Microsoft MSMQ database, a flat file directory, and so forth. Thus, while a system administrator may be managing five different queues implemented with different data store products, the five intelligent queues may behave and interact the same regardless of the underlying data store. In addition, this flexibility allows businesses to use existing commercial products to support their intelligent queues and to have the ability to change data stores without having to disrupt and reorganize the entire system.

An additional benefit of one embodiment is that the intelligent queue is easily managed in a large-scale environment. A large enterprise may employ hundreds of intelligent queues. Thus, the ability to use a single type of queue throughout the system affords the system administrator the ability to perform message tracking while dealing with only one type of queue, regardless of the underlying data store.

Another benefit of one embodiment is that the intelligent queue provides a way to track the state of its messages allowing system managers to know the status of a message from both the sender and the recipient's perspective. In addition, knowledge of the message states allows the messages to be recovered and resent after system failure. Furthermore, a message's state may be changed to designate activity rather than tying up system resources to move a message to a different location or to delete a message. Interoperability between queues implemented using different data stores is also provided. Regardless of the type of data store, the messages may be recovered in event of a system failure.

A further benefit of one embodiment is that the intelligent queue provides extended message storage. System administrators may specify when a message should be removed from the intelligent queue allowing messages to remain in the intelligent queue even after all subscribers to the message have processed the message. Thus, system administrators have time to track, distribute, archive, edit, and perform other administrative tasks, as necessary. Furthermore, when system failure occurs, system administrators are able to view the messages in the queue and perform the appropriate message recovery. The intelligent queue can make available unprocessed messages to the appropriate application without exposing messages that have already been processed.

An additional benefit of one embodiment is that the intelligent queue may provide load balancing through the use of subscriber pooling. A message may be made available for several recipients such that the first available recipient processes the message maximizing resources and improving message queuing efficiency. The intelligent queue may also enable recipients to be designated as members of a subscriber pool. In addition, a combination of load balancing and publish/subscribe operations may be used to improve efficiency. For example, the members of the subscriber pool may subscribe to messages in the intelligent queue in parallel with recipients not in the subscriber pool.

Another benefit of one embodiment is that the intelligent queue may be centrally managed allowing for a remote user to perform maintenance and monitoring of the various intelligent queues.

The intelligent queue ("IQ") provides persistent data storage for facilitating communication among a variety of applications and components. The following example illustrates the IQ in operation in publish/subscribe mode. Figure IA illustrates a transaction system that includes a point of sale system 110 that sends a transaction for credit approval by an automated credit approval system 120. First, the point of sale ("POS") module 130 receives a transaction from the point of sale system 110 and converts the transaction into a standard message format. The point of sale module 130 then publishes the message to the Sybase IQ 140, implemented using the Sybase database. Next, the customer database module 150 retrieves the message from the Sybase IQ 140 and queries the customer database 160 for relevant customer information (e.g., credit account, banking institution, etc.). Then, the customer database module 150 adds the relevant customer information to the message and publishes the message to the MSMQ IQ 170, implemented using Microsoft's MSMQ queue. Finally, the credit approval module 180 retrieves the message from the MSMQ IQ 170 and converts the message into a format understood by the credit approval system 120.

Figure 1B:
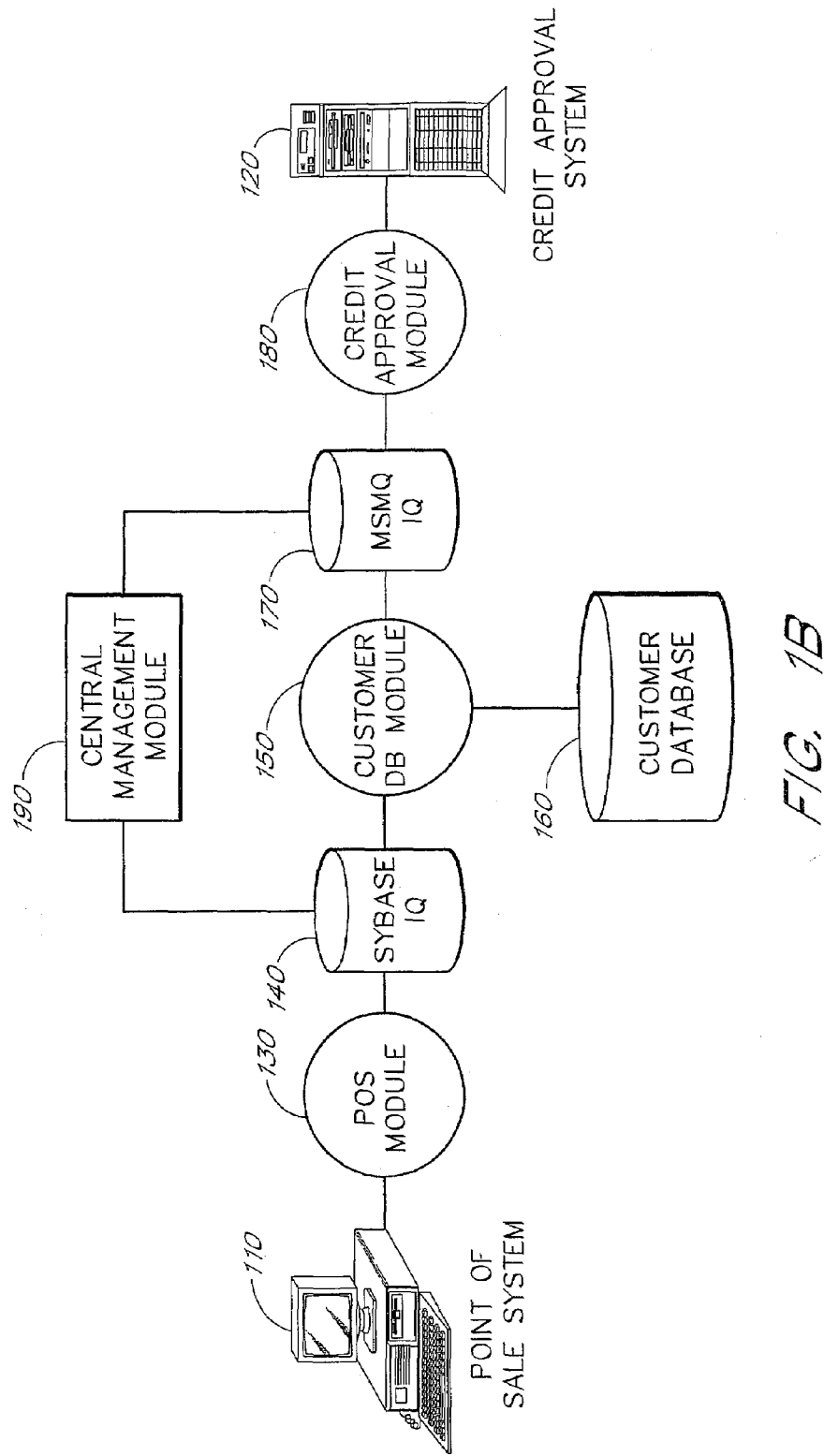
FIG. 1B illustrates a high-level block diagram of an additional embodiment of an application integration system that includes intelligent queues.
Figure 2A:
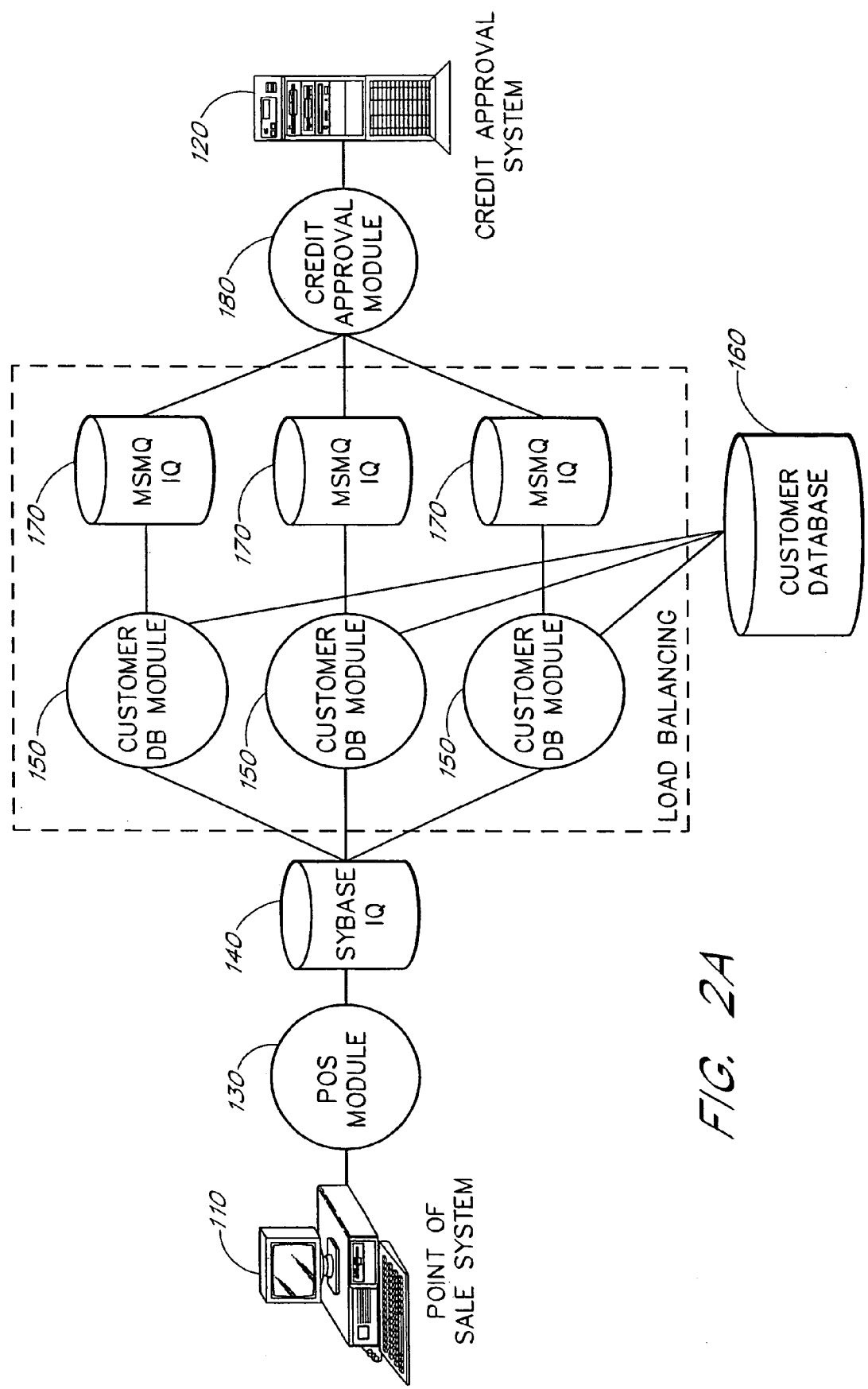
FIG. 2A illustrates a high-level block diagram of an additional embodiment of an application integration system that includes intelligent queues.

FIG. 1B illustrates another embodiment of a transaction system that includes a point of sale system 110 that sends a transaction for credit approval to an automated credit approval system 120 as well as to a central management module 190. The central management module 190 allows for the management and monitoring of the intelligent queues from a remote location. For example, via the central management module 190, subscribers and publishers may be assigned and/or error checking may occur. In one embodiment, the central management module 190 may be implemented on a system that is remote from one or all of the intelligent queues. A detailed description of one embodiment of a central management module is disclosed in an application having the title "SYSTEM AND METHODS FOR PROVIDING CENTRALIZED MANAGEMENT OF HETEROGENEOUS DISTRIBUTED ENTERPRISE APPLICATION INTEGRATION OBJECTS," U.S. application Ser. No. 09/703,888, filed on Nov. 1, 2000, which is incorporated herein by reference. FIG. 2A illustrates a second example transaction system wherein the customer database module 150 and MSMQ IQs 170 are duplicated to allow for load balancing. In the second transaction system, the Sybase IQ 140 may include messages that may be retrieved by any of the customer database modules 150. This load balancing is implemented using subscriber pooling such that the first available customer database module 150 may process the message. This system decreases the occurrence of bottlenecks, and improves the throughput time for messages being retrieved from the Sybase IQ 140.

Figure 2B:
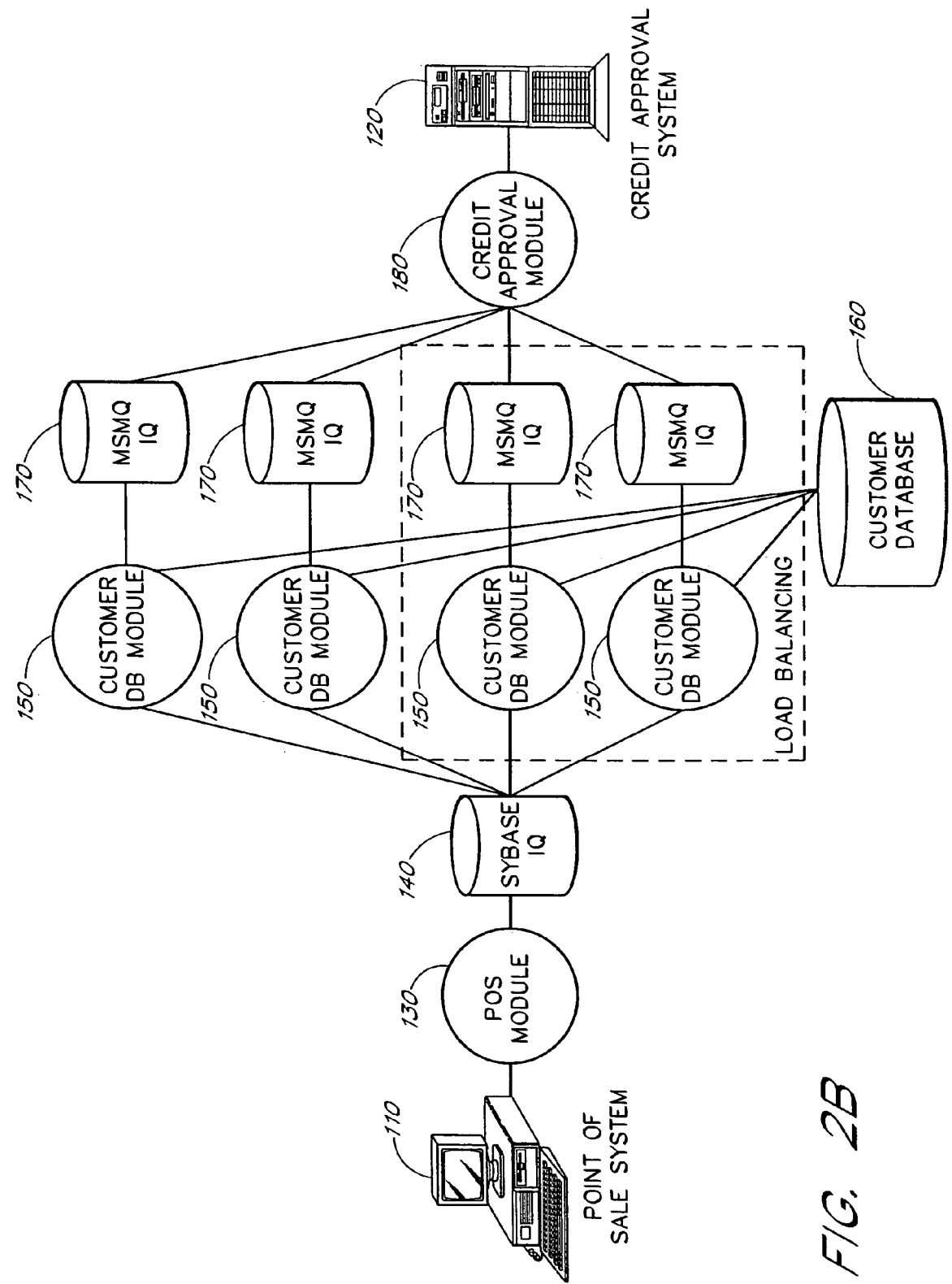
FIG. 2B illustrates a high-level block diagram of an additional embodiment of an application integration system that includes intelligent queues.

FIG. 2B illustrates a third example transaction system wherein some of the customer database modules 150 and MSMQ IQs 170 are duplicated to allow for load balancing and subscriber pooling while other of the customer database modules 150 and MSMQ IQs 170 are in publish/subscribe mode. In the second transaction system, the Sybase IQ 140 may include messages that can be retrieved by any of the customer database modules 150. This load balancing is implemented using subscriber pooling such that the first available customer database module 150 may process the message. This system decreases the occurrence of bottlenecks, and improves the throughput time for messages being retrieved from the Sybase IQ 140.

Figure 3:
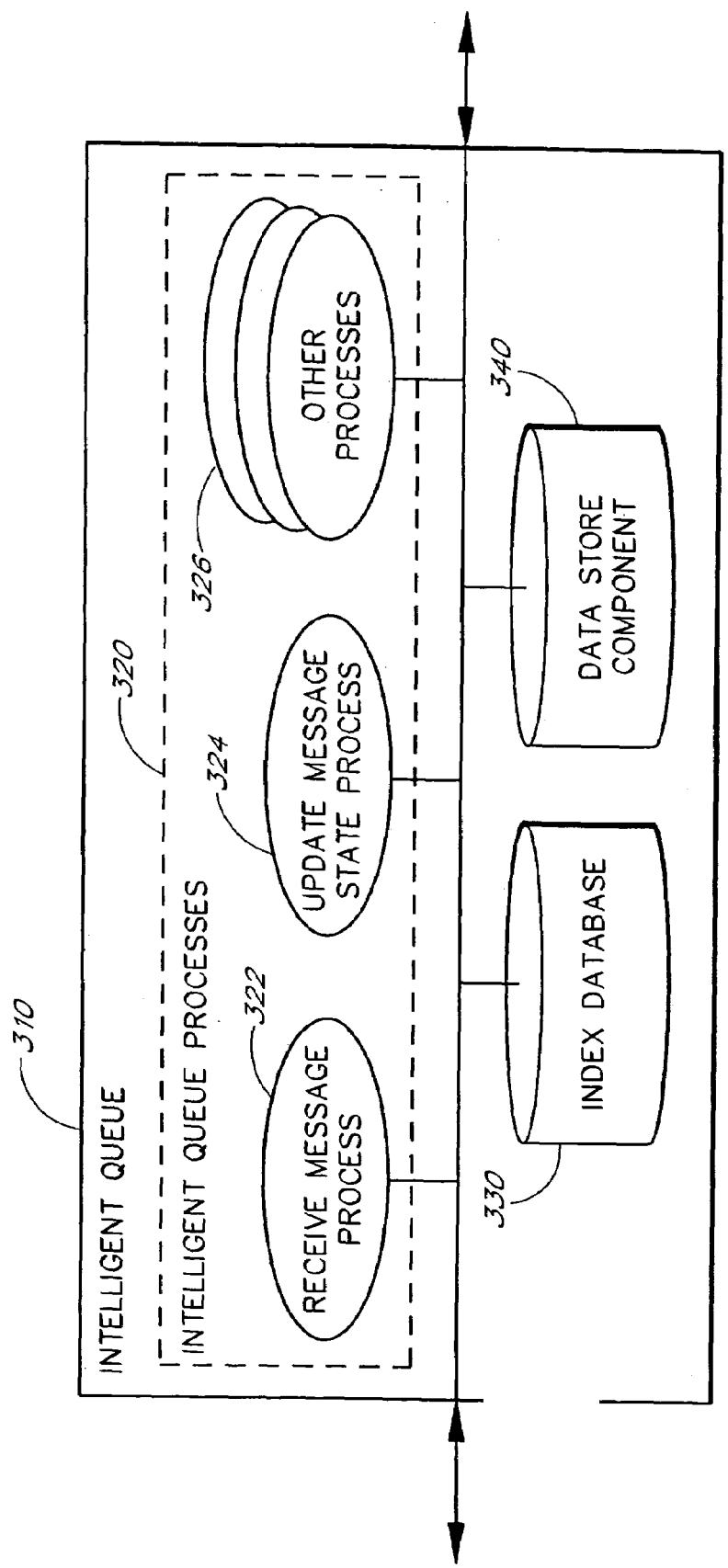
FIG. 3 illustrates a high-level diagram of one embodiment of an intelligent queue.

While the examples illustrated in FIGS. 2A and 2B do not include a central management module 190, it is recognized that in other embodiments, the central management module 190 may also be included if one or more of the intelligent queues is in load balancing mode. FIG. 3 illustrates one embodiment of an intelligent queue 310. The intelligent queue 310 includes a set of intelligent queue processes 320, an index database 330, and a data store component 340.

The intelligent queue 310 includes many processes that may be used to add and extract information to and from the queue. In one embodiment, the intelligent queue processes include a receive message process 322, an update message state process 324, as well as several other processes 326 that may provide information about messages in the queue. The intelligent queue processes 320 are described in greater detail below.

The index database 330 stores the message state information for each message that is published to the queue. In one embodiment, the index database 330 is implemented using a flat file structure and updated each time a message state is changed. The index database 330 may communicate with an archive database (not shown) in which information is stored on a periodic basis, such as, for example, hourly, daily, weekly, bi-weekly, and so forth. The index database 330 may be used after a system failure to determine the status of each message before and after the failure and to provide information on how the system should be restored.

The data store component 340 is the component that stores the messages for retrieval by the subscribers. The data store component 340 acts as a temporary storage unit wherein messages may be published and stored until all of the subscribers are able to fetch and process the messages.

While the index database 330 and the data store component 340 are represented as two separate data structures, it is recognized that in other embodiments, the index database 330 and the data store component 340 may be combined and/or implemented using the same data structure. For example, the index database 330 and the data store component 340 may be implemented as sets of tables within the same relational database. Furthermore, it is recognized that a variety of data structures may be used to implement the index database 330 and/or the data store component 340, such as, for example, linked lists, flat files, binary trees, B+trees, arrays, queues, databases, and so forth. In addition, different types of databases may be used, such as, relational databases, object oriented databases, hierarchical databases, and so forth. Further, several commercial data store products may also be used, such as, the Sybase CT Lib database, the Oracle OCI database, the Oracle AQ database, an IBM-MQ Series database, the Microsoft MSMQ database, Microsoft Access, Oracle, Paradox, Fox Pro, Microsoft® SQL Server, as well as other proprietary databases.

While the intelligent queue 310 in FIG. 3 is implemented using several components, it is recognized that in other embodiments, the intelligent queue 310 may be implemented as a single component 310, such as a proprietary data store component 340 that includes an index database 320 as well as the intelligent queue processes 320.

The intelligent queue 310 may run in a variety of modes, such as the publish/subscribe mode, the load balancing mode, and/or the combination mode.

The intelligent queues 310 may perform in a publish/subscribe mode wherein a publisher places a message in the intelligent queue that is to be retrieved by one or more subscribers. This publish/subscribe mode avoids duplication of messages as only a single instance of the message is saved in the queue even though it is to be accessed by several subscribers.

The intelligent queues 310 may also perform in a load-balancing mode wherein the intelligent queue permits subscriber pooling. In load-balancing mode, the intelligent queue 310 may receive a message from a publisher that is intended for one of several subscribers. The publisher does not care which subscriber fetches the message, so long as the message is not fetched by more than one subscriber. The load-balancing feature shortens the length of the average queuing period and helps to alleviate bottlenecks.

The intelligent queue 310 may be configured to run in publish/subscriber mode at all times. In another embodiment, the intelligent queue 310 may be configured to run in load-balancing mode at all times, or in another embodiment, the intelligent queue 310 may be designed to run in load-balancing mode upon the trigger of some event, such as, for example, when network traffic exceeds a predetermined threshold. In a further embodiment, the intelligent queue 310 may be designed to run publish/subscribe mode, load balancing mode, and a combination mode depending on each individual message.

Figure 4:
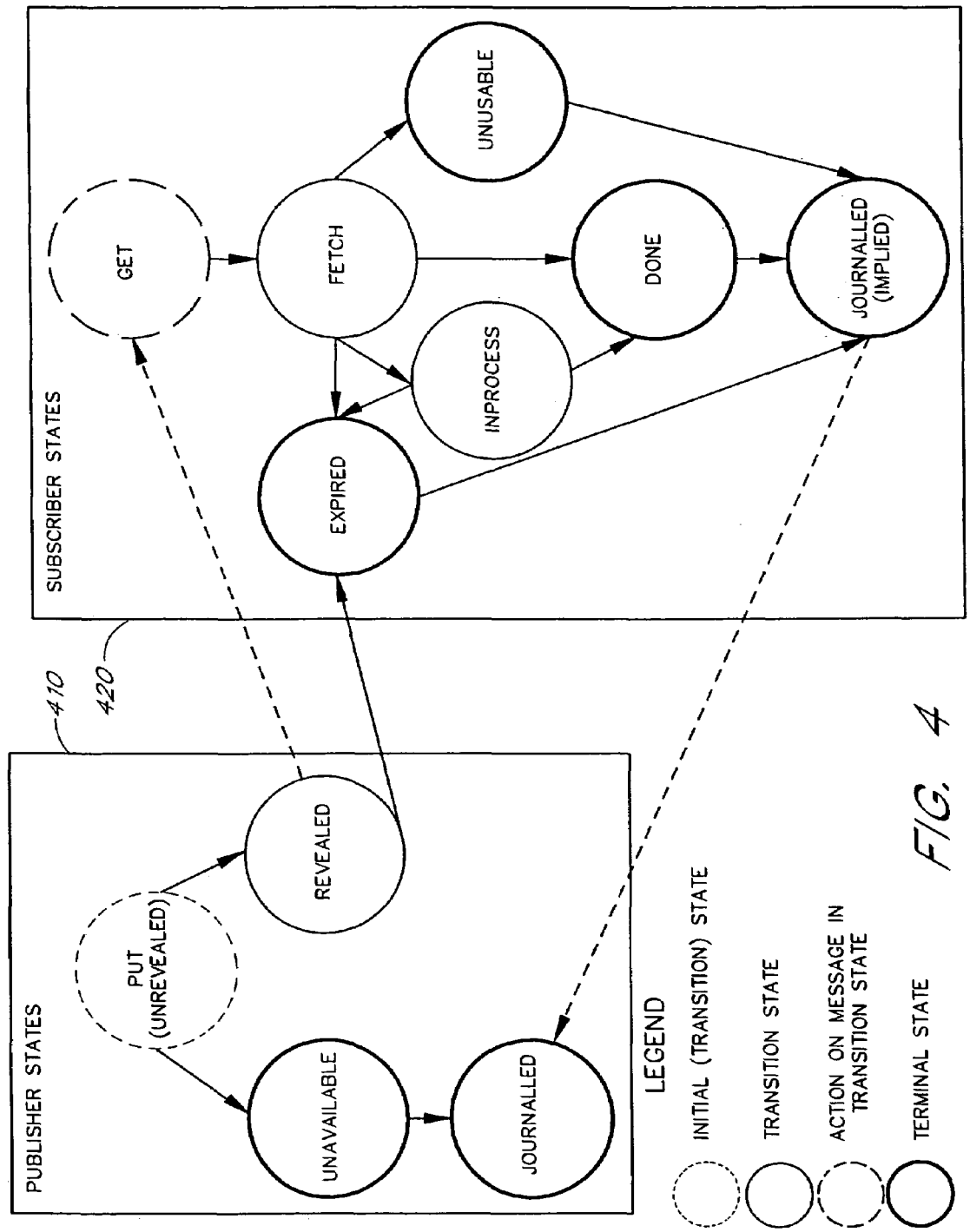
FIG. 4 illustrates a flowchart of one embodiment of a state diagram for message states.

The intelligent queues 310 track message states for each state that a message enters. These message states correspond to events that occur from the publisher's perspective and the subscriber's perspective. FIG. 4 illustrates one embodiment of the message states and their transitions.

The intelligent queue provides two classes of message states publisher states 410 and subscriber states 420.

The publisher states 410 allow a message publisher to specify the status of each message after the publisher places the message in an intelligent queue.

PUT:
   The publisher has placed the message in the intelligent queue.

REVEALED:

The publisher has made the message available to the subscribers.

UNAVAILABLE:

The message is not available for any subscriber.

JOURNALLED:

All intended subscribers have retrieved the message. The message will remain in the journalled state (thus allowing for extended message storage time) such that other processing of the message may be performed (e.g., archiving by the system administrator, retrieval by non-subscribers, etc.).

The subscriber states 420 allow each message subscriber to specify the status of each message after the publisher has made the message available in the intelligent queue. Message state information records the status of each message subscriber such that a subscriber may be precluded from retrieving a message that it has already retrieved.

GET:

The message subscriber has begun the retrieval process.

FETCHED:

The message subscriber has retrieved the message successfully, but has not yet finished.

IN PROCESS:

The message subscriber is processing the message.

UNUSABLE:

The message subscriber's retrieval of the message has failed.

DONE:

The subscriber has finished retrieving the message and, if necessary, processing the message.

JOURNALLED:

The message subscriber is finished with the message as the subscriber has successfully retrieved and, if necessary, processed the message, the message retrieval failed, or the message expired. The message will remain in the journalled state (thus allowing for extended message storage time) such that other processing of the message may be performed (e.g., archiving by the system administrator, retrieval by non-subscribers, etc.)

EXPIRED:

The message has expired beyond a pre-specified time limit.

This state may be automatically controlled or may be triggered by the publisher or subscriber.

In the embodiment illustrated by FIG. 4, there are several terminal states, including the UNAVAILABLE state, the JOURNALLED state, the EXPIRED state, the UNUSABLE state, the DONE state, and the JOURNALLED (IMPLIED) state. By changing the message states, message can be efficiently journalled because there is no need to copy or remove them into an archived directory. Resources normally required to copy or remove messages may be allocated to other tasks.

To illustrate the publish/subscribe mode, assume that Publisher X wants to publish a message to be retrieved by Subscriber 0, Subscriber 1, and Subscriber 2. Publisher X may not care about the order in which the messages are retrieved, but wants to ensure that all subscribers retrieve the message. In other embodiments, the publisher may designate an order in which the messages are retrieved, such as, for example, by making the message revealed to each subscriber one at a time.

Referring to the first example, first, Publisher X places the message in the queue as a publish/subscribe message. Next, Publisher X reveals the message for Subscriber 0, Subscriber 1, and Subscriber 2.

Assume that Subscriber 2 then begins processing the message and enters the Get state. Next, Subscriber 2 fetches the message and proceeds to the Done state and then the Journalled state.

While Subscriber 2 was in the Fetched state, Subscriber 0 may then begin processing the message in the Get state and then fetch the message and proceed to the Fetched state. Subscriber 0 may determine that the message is unreadable and then proceed to the Unusable state and onto the Journalled state. Subscriber 0 may then inform Publisher X that it was unable to fetch the message.

Finally, Subscriber 1 may begin processing the message in the Get state and then move to the Fetched state. Subscriber 1 may then process the message in the In Process state and proceed to the Done state and then to the Journalled state.

After Subscriber 0, Subscriber 1, and Subscriber 2 have all entered the Journalled state, Publisher X then proceeds to the Journalled State.

To illustrate the load balancing mode, in this example, assume that Publisher X wants to publish a message to be retrieved by Subscriber 0, Subscriber 1, or Subscriber 2. Publisher X does not care which subscriber retrieves the message, but would like it retrieved by the first available subscriber. First, Publisher X places the message in the queue as a load/balancing message. Next, Publisher X reveals the message for Subscriber 0, Subscriber 1, or Subscriber 2. Assume that Subscriber 2 then begins processing the message and enters the Get state. The state of the message for Subscriber 0 and Subscriber 1 changes to Expired and then to Journalled allowing Subscriber 0 and Subscriber 1 to process a different message when they are free. As soon as Subscriber 2 has successfully fetched the message and moves to the Journalled state, Publisher X changes the state of the message to Journalled.

While the above examples illustrate intelligent queues that process messages designated in either publish/subscribe mode or load balancing mode, it is recognized that the message may be designated as a combination of both. For example, Publisher X may want to publish a message to be retrieved by Subscriber 0 or Subscriber 1, Subscriber 2, and Subscriber 3. Thus, in the end, either Subscriber 0, Subscriber 2, and Subscriber 3 should have the retrieved message, or Subscriber 1, Subscriber 2, and Subscriber 3 should have the message.

First, Publisher X places the message in the queue. In one embodiment, the intelligent queue may treat this as two messages, one message using load balancing between Subscriber 0 and Subscriber 1 with the other message using publish/subscribe mode with Subscriber 2 and Subscriber 3. In another embodiment, the publisher may designate to which subscribers the message is revealed. Thus, after Subscriber 0 or Subscriber 1 begins processing the message, the message becomes expired the Subscriber(s) that did not retrieve the message.

An advantage of one embodiment of this invention is the ability to perform message recovery when a system failure occurs. Furthermore, the message recovery may also allow for interoperability between intelligent queues implemented using different data stores. In addition, the interoperability may allow for data translation, interfacing, correlation services, and/or data recovery. The data translation may allow data to be translated from one format to another, such as, for example, from MS IQ format to Oracle IQ format. Furthermore, interfacing may include providing connection details, such as, for example, network protocols, application programming interface calls, long connections, and so forth. The correlation services may include combining multiple message into a single message and publishing it to another message queue. The data recovery may include procedures for restoring the messages in the queue. Thus, regardless of the type of data store, the messages may be recovered in event of a system failure.

To illustrate message recovery using the message state information in operation, in this example, assume that the system illustrated in FIG. 1A is in the process of recovering from a system failure. Further, assume that the Sybase IQ 140 is a inbound queue and the MSMQ IQ 170 is an outbound queue. When a message is processed by a module, the original message is referred to as the parent message and the processed message is referred to as the child message. The following provides one embodiment of a set of recovery logic steps that may be used to restore the system.

Step 1:
Go through the MSMQ IQ 170 to find messages that are not marked "Revealed." These messages have "Clean" state.

Step 2:
Once a "Clean" message is found extract the path information to find the parents of the message. If the message does not have parents, go to Step 4.

Step 3:
Go to the Sybase IQ 140 to check each parent message's state.

If one of the parent messages is marked "Done," then mark all parent messages "Done" and mark the child message "Revealed." If none of the parent messages is marked "Done," then mark all parent messages "Clean" and mark the child message "Deleted."

Step 4:
If the message does not have parent, mark this message "Revealed."

Step 5:
After the "Clean" messages in the MSMQ IQ 170 are processed ("recovered"), go through the Sybase IQ 140 to find messages that are marked "Fetched" but not "Done." Mark these "Fetched but not Done" messages "Clean."

Thus, if the POS module 130 fails, the following guidelines may be used to recover the messages.

Scenario 1:
If a message is published onto the Sybase IQ 140 and message is not fetched, then follow Step 1, Step 2, and then Step 4.

Scenario 2:
If a message is put onto the Sybase IQ 140 and message is marked "Fetched," then let the subscriber do the recovery.

If the credit approval module 180 fails, the following guidelines may be used to recover the messages.

Scenario 1:
If a message is fetched but not marked "Done," then follow Step 5.

If the customer database module 150 fails, the following guidelines may be used to recover the messages.

Scenario 1:
If a message is fetched from Sybase IQ 140 but not put onto the MSMQ IQ 170, then follow Step 5.

Scenario 2:
If a message is fetched from the Sybase IQ 140 and put onto the MSMQ IQ 170, then follow Step 1, Step 2, and then Step 3.

Scenario 3:
If a message is fetched from the Sybase IQ 140, put onto the MSMQ IQ 170, and marked "Done" in the Sybase IQ 140, then follow Step 1, Step 2, and then Step 3.

It is recognized that the above recovery logic illustrates one embodiment of message recovery using message state information and that other embodiments may be used.

In one embodiment, the message states are recorded in a file that corresponds to the message and is stored in the intelligent queue index. It is recognized that in other embodiments, the message states may be recorded in other data structures, such as, for example, a linked list, a finite state machine, a tree, a graph, and so forth. Furthermore, in other embodiments, the message state information may be located within the message, with information about other messages, and so forth.

FIG. 5 illustrates one embodiment of message object 510. The message object 510 includes message state information, such as, the message identifier, the publisher ID, and the subscriber IDs. In addition, for each publisher and subscriber, the message state information includes the time stamp for each state that has already occurred, and the current state. It is recognized that in other embodiments, other formats of message information and may be used. For example, in one embodiment, the message identifier may be assigned by the publisher of the message, whereas in another embodiment, the message identifier may be automatically generated by the intelligent queue.

For example, the exemplary message object 510 in FIG. 5 was published by Publisher X in publish/subscriber mode and intended for Subscribers 0-2. Publisher X placed the message in the queue at time 12:14:03. Nine seconds later, the message was revealed and thus available to be retrieved by the subscribers. Finally, after the message had been journalled by all subscribers, the publisher journalled the message at 12:16:09.

Subscriber 0 started processing the message at 12:14:13. Thirteen seconds later, it fetched the message and was done retrieving the message at 12:14:54. Subscriber 0 then journalled the message at 12:15:02.

Subscriber 1 started processing the message at 12:14:25, and sixty one seconds later fetched the message. At 12:15:51, Subscriber 1 began processing the message and finished ten seconds later. At 12:16:07, Subscriber 1 journalled the message.

Subscriber 2 started processing the message at 12:15:08. At 12:15:32, Subscriber 2 fetched the message and at 12:15:44, Subscriber 2 declared the message unusable and journalled the message at 12:15:59.

After the message has been journalled, Subscriber 2 may inform the publisher that it encountered a problem with retrieving the message, and thus, the publisher may make the message available again for Subscriber 2.

In addition, if a system failure occurred, the system administrator would know that only Subscriber 2 would need the message and that Subscriber 0 and Subscriber 1 had successfully retrieved the message.

The intelligent queue 310 includes intelligent queue processes 320 that may be used to add and extract information to and from the queue. In one embodiment, the intelligent queue processes 320 include a receive message process 322, an update message state process 324, as well as several other process 326 that may provide information about information in the queue.

Figure 6:
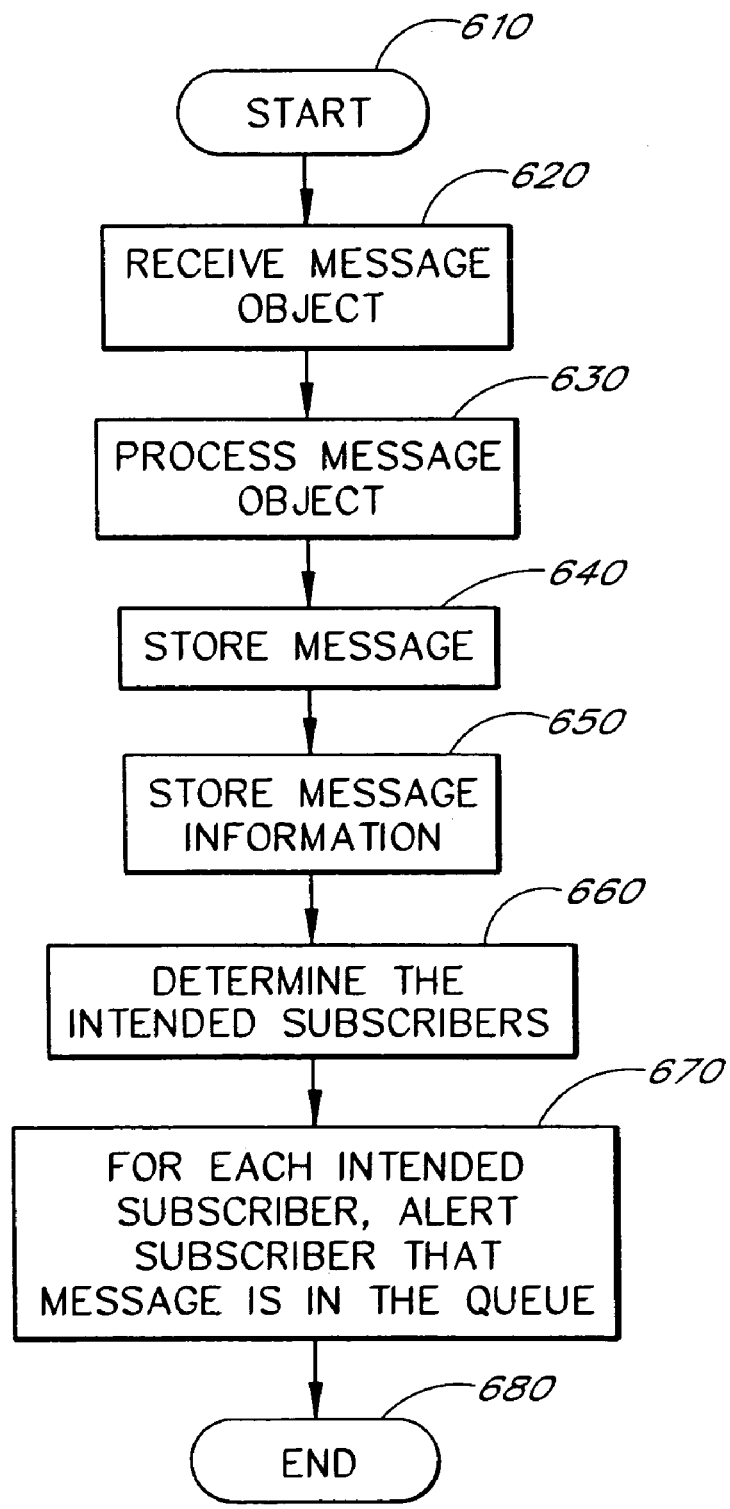
FIG. 6 illustrates a flowchart of one embodiment of a receive message process.

The receive message process 322 receives a message object from a publisher and places the message object in the queue. FIG. 6 illustrates one embodiment of the receive message process 322 wherein a subscriber sends a message object to the intelligent queue.

Beginning at a start state (block 610), the receive message process 322 receives a message object from a publisher (block 620). Next, the receive message process 322 performs checks on the message object (block 630), such as, for example, error detection, error correction, and/or verification of the sender. The receive message process 322 then stores the message in the data store (block 640). As discussed above, the data store may be implemented using a variety of data structures, such as, for example, a B+tree, a flat file directory, a linked list, a tree, an array, a database, and so forth. Next, the receive message process 322 stores the message information corresponding to the message in the index (block 650). In one embodiment, the message information may be sent from the publisher, while in other embodiments, the receive message process 322 may derive the message information from the message header, default values, and so forth. The receive message process 322 may then determine which subscribers are supposed to retrieve the message (block 660). This may include determining all of the subscribers that should retrieve the message such as in the publish/subscribe mode, as well as all of the subscribers that are eligible to retrieve the message such as in the load balancing mode. Finally, for each subscriber, the receive message process 322 sends the subscriber an alert informing the subscriber that a message is available in the queue (block 670) and proceeds to an end state (block 680).

Figure 7:
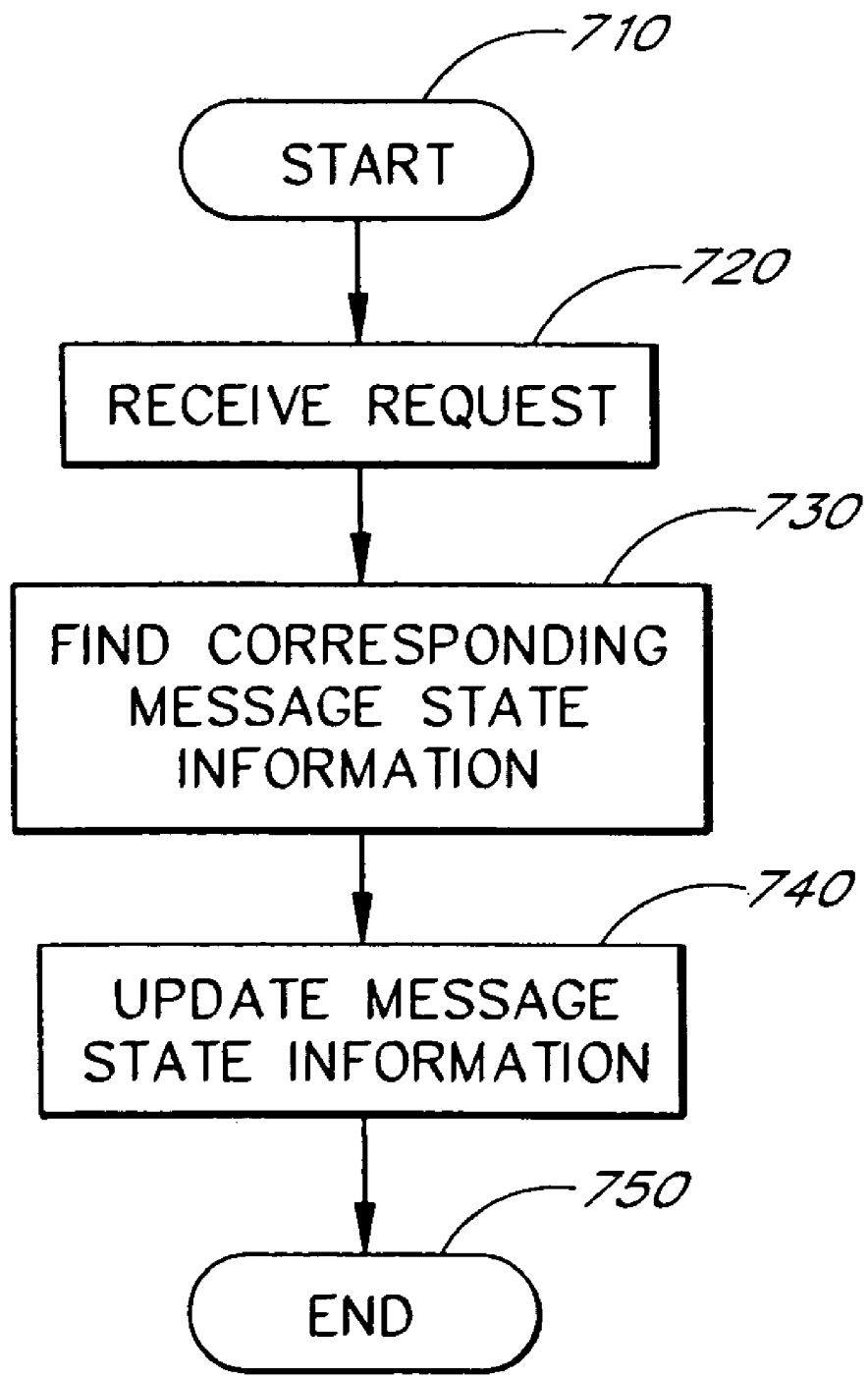
FIG. 7 illustrates a flowchart of one embodiment of an update message state process.

The update message state process 324 receives an update request from a publisher or subscriber and updates the corresponding message state in the index. FIG. 7 illustrates one embodiment of the update message state process 324 wherein a publisher or subscriber sends an update request to the intelligent queue.

Beginning at a start state (block 710), the update message state process 324 receives an update request from a publisher or a subscriber (block 720). The update request may be in a variety formats, such as, for example, an email, a data structure, a data record, a message object, and so forth. Next, the update message state process 324 locates the message state information in the index that corresponds to the update request (block 730). Finally, the update message state process 324 updates the message state information with the updated information (block 740) and proceeds to an end state (block 750). For example, the update message state process 324 may add the new time stamp of the current state to the corresponding state and change the value of the "current state" field to the current state.

It is recognized that in other embodiments, the message state information may be automatically updated. For example, when a subscriber retrieves a message, the intelligent queue may automatically record the time that the retrieval was made.

The intelligent queue processes 320 may include other process that provide information about information in the queue. For example, the intelligent queue may include a retrieve message process that retrieves a copy of a message from the queue and forwards the copy to a subscriber. The intelligent queue may also include a view message process that allows an outside party to view message information and/or message state information in the queue without making any alterations to the information. A set message priority process may also be included that sets the priority of a message within the queue, as well as a set of get information processes that retrieve designated pieces of information about a message, such as, for example, the message subject, the message handle, the message header, and so forth.

It is recognized that various embodiments of the invention may be used and that the example provided above is meant only to illustrate various uses of the invention and not to limit the scope of the invention.

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A computer program product for managing one or more queues, embodied on computer readable-material, that includes executable instructions for causing a computer system to:
   determine that a message in a queue is available for several subscribers to process, wherein at least some of the several subscribers eligible to process the message are in a subscriber pool;
   track the message to designate a publisher state and one or more subscriber states;
   allow a first available subscriber from the subscriber pool to process the message; and
   prevent all other subscribers in the subscriber pool from processing the message so that the message is processed by only one of the subscribers in the subscriber pool;
   wherein a set of message state information is maintained for each of the subscribers in the subscriber pool, and wherein the instructions to prevent all other subscribers in the subscriber pool from processing the message includes instructions to cause a computer system to:
   update the message state information for each of the subscribers in the subscriber pool, other than the first available subscriber, to indicate that the message is no longer to be processed by that subscriber.

2. The computer program product of claim 1, wherein the computer program product includes instructions to cause a computer system to:
   determine that another of the several subscribers is not in the subscriber pool; and
   allow the subscriber not in the subscriber pool to also process the message.

3. The computer program product of claim 1, wherein the instructions to track the message include instructions to cause a computer system to:
   designate the publisher state, including designating one or more of an indication of whether the message has been placed in a publisher queue, an indication of whether the message is available to the plurality of subscribers or an indication of whether all subscribers intended to retrieve the message have retrieved the message; and
   designate a subscriber state, including designating one or more of an indication of whether a first subscriber has begun retrieval, an indication of whether the first subscriber has successfully retrieved the message, an indication of whether the first subscriber has processed the message, an indication of whether the first subscriber is processing the message or an indication of whether the message is expired.

4. The computer program product of claim 1, wherein the instructions to track the message include instructions to track a subscriber state for each subscriber eligible to process the message.

5. The computer program product of claim 1, wherein the computer program product includes instructions to cause a computer system to retain the message in the queue until after all subscribers intended to retrieve the message have processed the message and a system administrator has had time to access the message.

6. The computer program product of claim 1, wherein the computer program product includes instructions to cause a computer system to:
 determine when a component in a transaction system fails; and
 in response to determining that the component has failed, perform data recovery on the queue, including determining whether the message has been successfully processed, and if the message has not been successfully processed, permitting a subscriber to process the message.

7. A method for managing one or more queues, including:
 determining that a message in a queue is available for several subscribers to process, wherein some of the several subscribers eligible to process the message are in a subscriber pool;
 tracking the message, including designating a publisher state and one or more subscriber states;
 allowing a first available subscriber from the subscriber pool to process the message;
 preventing all other subscribers in the subscriber pool from processing the message so that the message is processed by only one of the subscribers in the subscriber pool;
 determining that another of the several subscribers is not in the subscriber pool; and
 allowing the subscriber not in the subscriber pool to also process the message;
 wherein a set of message state information is maintained for each of the subscribers in the subscriber pool, and wherein preventing all other subscribers in the subscriber pool from processing the message comprises:
 updating the message state information for each of the subscribers in the subscriber pool, other than the first available subscriber, to indicate that the message is no longer to be processed by that subscriber.

8. The method of claim 7, wherein tracking the message comprises:
 designating the publisher state, including designating one or more of an indication of whether the message has been placed in a publisher queue, an indication of whether the message is available to the plurality of subscribers or an indication of whether all subscribers intended to retrieve the message have retrieved the message; and
 designating a subscriber state, including designating one or more of an indication of whether a first subscriber has begun retrieval, an indication of whether the first subscriber has successfully retrieved the message, an indication of whether the first subscriber has processed the message, an indication of whether the first subscriber is processing the message or an indication of whether the message is expired.

9. The method of claim 7, wherein tracking the message includes tracking a subscriber state for each subscriber eligible to process the message.

10. The method of claim 7, further comprising retaining the message in the queue until after all subscribers intended to retrieve the message have processed the message and a system administrator has had time to access the message.

11. The method of claim 7, further comprising:
 determining when a component in a transaction system fails; and
 in response to determining that the component has failed, performing data recovery on the queue, including determining whether the message has been successfully processed, and if the message has not been successfully processed, permitting a subscriber to process the message.

12. The method of claim 11, further comprising preventing a subscriber from retrieving a message that has already been successfully processed.

13. A computer program product for managing one or more queues, embodied on computer readable-material, that includes executable instructions for causing a computer system to:
 track a message in a transaction system, including specifying a publisher state and a subscriber state for the message;
 perform data recovery when a component of the transaction system fails; and
 determine a removal time for when the message is to be removed from a queue, the removal time set to allow a system administrator to access the message for a duration after all subscribers intended to retrieve the message have processed the message;
 wherein the instructions for causing a computer system to perform data recovery include instructions to prevent the message from being processed by more than one subscriber from a pool of subscribers; and
 wherein the instructions for preventing the message from being processed by more than one subscriber include instructions to inspect a publisher state to determine whether a publisher has made the message available to subscribers, and instructions to inspect a subscriber state to determine whether one subscriber has processed the message, if the message was made available before failure, but not processed, then the message is made available for retrieval, if the message was not made available before failure, the message is made available for retrieval, and if the message was processed before failure, the message is not made available for retrieval.

14. The computer program product of claim 13, wherein the instructions for causing a computer system to perform data recovery include instructions to prevent the message from being processed more than one time.

* * * * *